United States Patent Office 3,448,754
Patented June 10, 1969

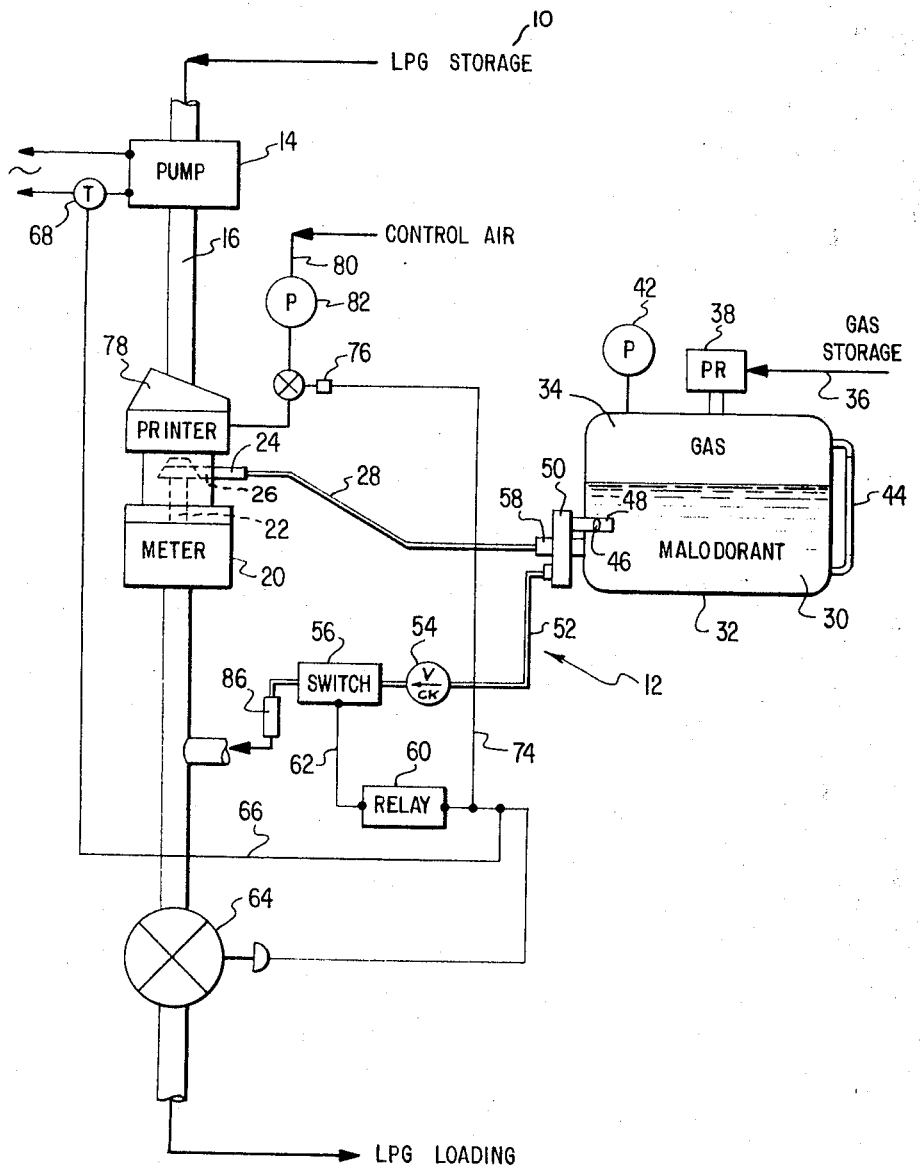
June 10, 1969     R. J. CRABTREE     3,448,754
SELF-PROPORTIONING FLOW SYSTEM
Filed Oct. 13, 1966
INVENTOR
REESE J. CRABTREE
ATTORNEYS.

3,448,754
SELF-PROPORTIONING FLOW SYSTEM
Reece J. Crabtree, Houston, Tex., assignor to Sinclair Research, Inc., New York, N.Y., a corporation of Delaware
Filed Oct. 13, 1966, Ser. No. 586,479
Int. Cl. G05d *11/02;* B01f *3/04, 15/04*
U.S. Cl. 137—99.5                                      6 Claims

ABSTRACT OF THE DISCLOSURE

There is disclosed a new apparatus for injection, measurement and control of an additive fluid to a primary fluid, such as a malodorant to LPG. Flow of the primary fluid is transformed to an arcual displacement which in turn displaces a pre-determined amount of the additive from a pressurized tank. The flow of the additive fluid controls the operation through sensing means of responsive means to stop the flow of the primary fluid. Two such responsive means can be utilized to better control the flow. Means to record the flow of the additive may also be included.

---

This invention relates to an injection system for mixing a fixed measure of a fluid into a flowing stream of another fluid in a predetermined proportion to the quantity of flow of the other fluid and, in particular, to a highly accurate malodorant injector constructed entirely from commercially available conventional parts for injecting a malodorant into a stream of a fluid such as liquefied petroleum gas.

Malodorant injection systems characteristically fall into two categories, e.g. highly accurateo complex injectors utilizing economically costly specially fabricated parts, and rugged relatively inaccurate injectors capable of being transported and installed easily under adverse field conditions. The latter type injection systems preferably employ a majority of commercially available conventional parts in order both to reduce the initial cost of installation and to minimize the shut down time required for the procurement of replacements upon failure of component parts. Because the conventional parts forming the rugged injectors often are not designed for correlated usage, the degree of accuracy of the system is marginal at most.

It is, therefore, an object of this invention to provide a highly accurate injection device for mixing a fixed amount of, for example, a malodorant with a predetermined quantity of liquefied petroleum gas. It is a further object of this invention to provide a rugged malodorant injector easily installable under adverse field conditions having an accuracy greater than 98%.

These and other objects of this invention are accomplished by positioning metering means within a liquefied petroleum gas flow stream to produce an arcual displacement proportional to the quantity of liquid petroleum flow which displacement is sensed by a mechanical power train take off from the metering means and transmitted to rotary sampling means located within an enclosed reservoir of malodorant fluid. The reservoir is maintained at superatmospheric pressure by means of an external pressurized gas source and upon a predetermined arcual revolution of the rotary sampling means produced by the displacement of the metering means, a fixed quantity of malodorant is withdrawn from the reservoir and discharged through valve means into the liquefied petroleum gas flow stream by the superatmospheric pressure applied to the enclosed reservoir of malodorant fluid. In order to protect the system against the flow of liquefied petroleum gas without the malodorant fluid additive, switching means responsive to a deficiency in flow of a predetermined quantity of malodorant fluid within a given period can be incorporated into the injection system to terminate the flow of liquid petroleum within the flow stream. Although this invention is described with reference to the injection of a malodorant into liquefied petroleum gas for clarity, it is not so limited and can be in general used to accurately inject one fluid into another.

A more complete understanding of the basic principles of this invention can be obtained from the appended drawing in which the sole figure pictorially depicts the malodorant injection system of this invention.

Referring more particularly to the figure, liquefied petroleum gas from storage tank 10 (not shown) is odorized by malodorant injector 12 as it is pumped via pump 14 through pipeline 16 to a loading stage for a transport vehicle, e.g. a railroad tank car which is employed to convey the petroleum gas to its utilization point. The quantity of liquefied petroleum gas flow to the transport vehicle is measured accurately by flow meter 20 positioned in pipeline 16 and a fixed arcual displacement for a given quantity of petroleum gas flow is produced in meter shaft 22 which extends, for example, from engagement with a revolving vane in contact with the flowing petroleum gas to an externally accessible location atop meter 20 where a mechanical power takeoff 24 from meter 20 is provided. Such devices are common and can include a bevel gear system as shown wherein a circular gear is axially seated upon shaft 22 and a gear 26 is rotatably mounted within an aperture in the upper sidewall of meter 20, the peripheral teeth of this gear being meshingly engaged with the teeth of the circular gear to function as a right angle drive to transmit the arcual displacement of shaft 22 to a rotary motion in power takeoff 24. Power takeoff 24 drives a flexible cable 28 in the fixed ratio of one revolution of the cable for a predetermined flow, e.g. 5 gallons of petroleum flow through meter 20.

The malodorant fluid 30 to be injected into the petroleum flow stream is any one of the chemical agents utilized for odorizing liquefied petroleum gas, e.g. ethyl mercaptan, and is stored in reservoir 32 under a superatmospheric pressure, e.g. of about 200 p.s.i. which pressure is maintained within the reservoir tank by an external pressurized gas 34 such as nitrogen, supplied from a source (not shown) communicating with the tank through conduit 36 and pressure regulator 38. Pressure gauge 42 is mounted in an aperture in the upper sidewall to provide a visual indication of the pressure of the nitrogen blanket 34 upon the malodorant fluid 30. The level of malodorant fluid 30 within tank 32 is observable externally of the tank by means of transparent sight indicator 44.

At the near end of tank 32 remote from sight indicator 44, an aperture is provided in the sidewall of the tank below the operable level of malodorant fluid 30 and a conduit 48 fixed therein to communicate with the exterior of tank 32 and a true-cut sampler 50. A filter 46 is provided in conduit 48. The true-cut sampler is constructed so that upon one complete revolution of the sampler a known quantity, e.g. 1 cc. of malodorant is withdrawn from the tank and discharged into conduit 52 through check valve 54 and switch 56. The sampler is of conventional construction and, for example, can be a gear driven rotatable sample plate having ports therein with spring-mounted closure plates. As the sample plate is rotated the ports pass conduit 48 and the high pressure of the gas 34 pushes the malodorant 30 into the port and fills it. Upon continued rotation of the sample plate, the spring-mounted closure plates force the malodorant into conduit 52 where a lower pressure prevails. A high differential pressure between the malodorant 30 in tank 32 and line 52 and the pressure in pipeline 16 propels the malodorant into line 16. Since the malodorant concentration required in the liquefied petroleum gas is small, e.g. only 1 cc. of mercaptan per 15 gallons of liquefied petroleum gas, a 3:1 gear reducer 58 is provided between meter 20 and true-cut sampler 50 to convert the rotary effect of shaft 22 upon sampler 50 frm one revolution of the sampler per 5 gallons of petroleum flow to one revolution per 15 gallons of petroleum flow. Thus, the utilization of gear reducer 58 removes the necessity for the special fabrication of either meter 20 or true-cut sampler 50 to provide an economically sound mixture of the fluids.

After discharge of the 1 cc. sample of mercaptan through check seal valve 54, the malodorant fluid passes through conduit 52 to flow switch 56 which functions to produce an electrical pulse output upon the passage of each 1 cc. of fluid therethrough. The pulsing electrical output from switch 56 is conducted through lead 62 to energize relay 60 which, in turn, controls the operation of motor valve 64 positioned within pipeline 16 to maintain the valve in its open position for a predetermined period of time normally slightly in excess of the time interval for 15 gallons of petroleum to flow through a fixed point in pipeline 16. Thus, unless relay 60 is reset continuously within this predetermined period by electrical pulses from flow switch 56 produced by the passage of 1 cc. of malodorant fluid from tank 32 to pipeline 16, the energization of motor valve 64 is terminated thereby closing the valve and restricting the flow of petroleum through the pipeline.

The output signal from relay 60 also is transmitted by conductor 66 to a normally open timer 68 positioned intermediate the power source for motor 14 to control the energization period during which the motor pumps petroleum through the pipeline. The interval of closure of timer 68 is fixed in conjunction with the pumping capacity of motor 14 to permit 15 gallons of petroleum to be pumped through pipeline 16 upon each reset of timer 68. If less than 1 cc. of malodorant should pass through flow switch 56 in the interval intermediate the resetting of the timer and the pumping of 15 gallons of petroleum by motor 14, a reset pulse is not delivered to timer 68 and the timer will revert to its normally open position to terminate the flow of energizing current to motor 14 and inhibit the passage of odorous petroleum to the loading stage.

A third electrical lead 74 from relay 60 is fed to solenoid valve 76 controlling the operation of printer 78 mounted atop meter 20 to record the quantity of malodorant mixed with the petroleum flow stream in pipeline 16. The printer of the commercial flow meter 20 employed in this system is pneumatically operated and tubing line 80 having both an air pressure regulator 82 and solenoid valve 76 positioned therein, is employed to communicate a supply of compressed air at recommended pressures to the meter. This control air operates the printer including rotation of a counter within the printer.

A tubular sight glass 86 is positioned within conduit 52 intermediate flow switch 56 and pipeline 16 to permit visual observation of the malodorant fluid flowing into the liquefied petroleum gas stream.

A malodorant injector fabricated in accordance with this invention has been found to accurately meter 1 cc. of malodorant into liquefied petroleum gas flows of from 14.8 to 15.2 gallons per cc., an error of slightly in excess of 1%.

Several distinct means have been incorporated into the system to assure the termination of liquefied petroleum gas flow without the malodorant additive. A first automatic protective means is the normally open timer 68 connected between the electrical power supply and the loading pump motor and operated by switch 56. A second automatic protective means also is controlled by switch 56 and includes motor valve 64 positioned in the main flow line 16.

It is claimed:
1. A system for mixing a fixed amount of a first fluid with a predetermined quantity of a second fluid within a flow stream thereof comprising meter means for measuring the flow of said second fluid including means for transforming said flow into an arcual displacement proportional to the quantity of said flow, an enclosed reservoir of said first fluid at a pressure above the pressure of said second fluid, means interconnecting said reservoir and said flow stream including sampling means for withdrawing said fixed amount of the first fluid upon arcual revolution thereof, drive means operatively interconnecting the means for transforming flow and said sampling means, and means including two switching means responsive to a deficiency in flow of said fixed amount of first fluid within a given period equivalent to the flow of said predetermined quantity of second liquid for terminating the flow of said second liquid, one of said switching means being located upstream of the entry of the first fluid and the other of said switching means being located downstream of the entry of the first fluid.

2. The system according to claim 1 wherein one of said switching means is a flow switch in said means interconnecting said reservoir and said flow stream providing an electrical pulse upon flow of said fixed quantity of the first fluid and said means for terminating flow of said second fluid comprises a normally closed motor valve means positioned in said flow stream responsive to said electrical pulse from said flow switch to permit passage of said flow stream for a predetermined period of time.

3. The system according to claim 2 wherein the other of said switching means includes pump means to propel said second liquid in said flow stream, an electrical system including a source of electrical energy and normally open switch means for operating said pump means, said source of electrical energy being connected to said pump means through said normally open switch means, and means responsive to said electrical pulse from the flow switch to close said normally open switch means for a predetermined period.

4. An injection system for injecting a known amount of malodorant into a flowing gas stream to provide a predetermined concentration of said malodorant in said stream, comprising meter means for measuring the flow of said gas stream including means for transforming said flow into a rotational displacement proportional to the quantity of said flow, a source of malodorant fluid at a pressure above the pressure of said flowing stream, rotary sampling means for withdrawing a known amount of malodorant fluid from said source upon a known rotational movement thereof, conduit means interconnecting said sampling means and said gas stream, drive means operatively interconnecting said meter means and said sampling means whereby said rotational displacement of said meter means drives said rotary sampling means including means for correlating said rotational displacement and said rotational movement of said sampling means to inject said known amount of the malodorant fluid into said gas stream to provide said predetermined concentration of malodorant fluid in said gas stream, sensing means in said conduit for sensing a deficiency in the flow of said known amount of malodorant fluid and means responsive to said sensing means for stopping flow of said gas stream upon the sensing of a deficiency.

5. The system of claim 4 wherein said sensing means is a flow switch providing a pulse upon flow therethrough of said known amount and said means responsive thereto is a valve in said flowing gas stream.

6. The system of claim 5 further including means for recording the flow of said gas stream including means responsive to said sensing means for recording the flow of malodorant fluid.

References Cited

UNITED STATES PATENTS

| | | | |
|---|---|---|---|
| 2,218,393 | 10/1940 | Corydon | 137—99 |
| 2,795,235 | 6/1957 | Hoyt | 137—99 |
| 2,940,460 | 6/1960 | Billeter | 137—99.5 |
| 2,949,123 | 8/1960 | Lawrence | 137—99 XR |
| 2,967,538 | 1/1961 | Hill et al. | 137—113 |
| 3,038,486 | 6/1962 | Thurman | 137—99 |
| 3,054,417 | 9/1962 | Corvisier | 137—99 |
| 3,074,277 | 1/1963 | Hill | 137—93 XR |
| 3,119,412 | 1/1964 | Kraft | 137—99 XR |
| 3,216,434 | 11/1965 | Lovendahl | 137—113 XR |

STANLEY N. GILREATH, *Primary Examiner.*

WERNER H. SCHROEDER, *Assistant Examiner.*

U.S. Cl. X.R.

137—109; 222—57